Sept. 6, 1949.　　　　　S. D. RUSSELL　　　　　2,481,244
MOVABLE BELT CONVEYER

Filed March 13, 1945　　　　　　　　　　　　　　　　3 Sheets-Sheet 1

Inventor:
Stanley D. Russell
By Thiess, Olson & Meckelnburger
Attys.

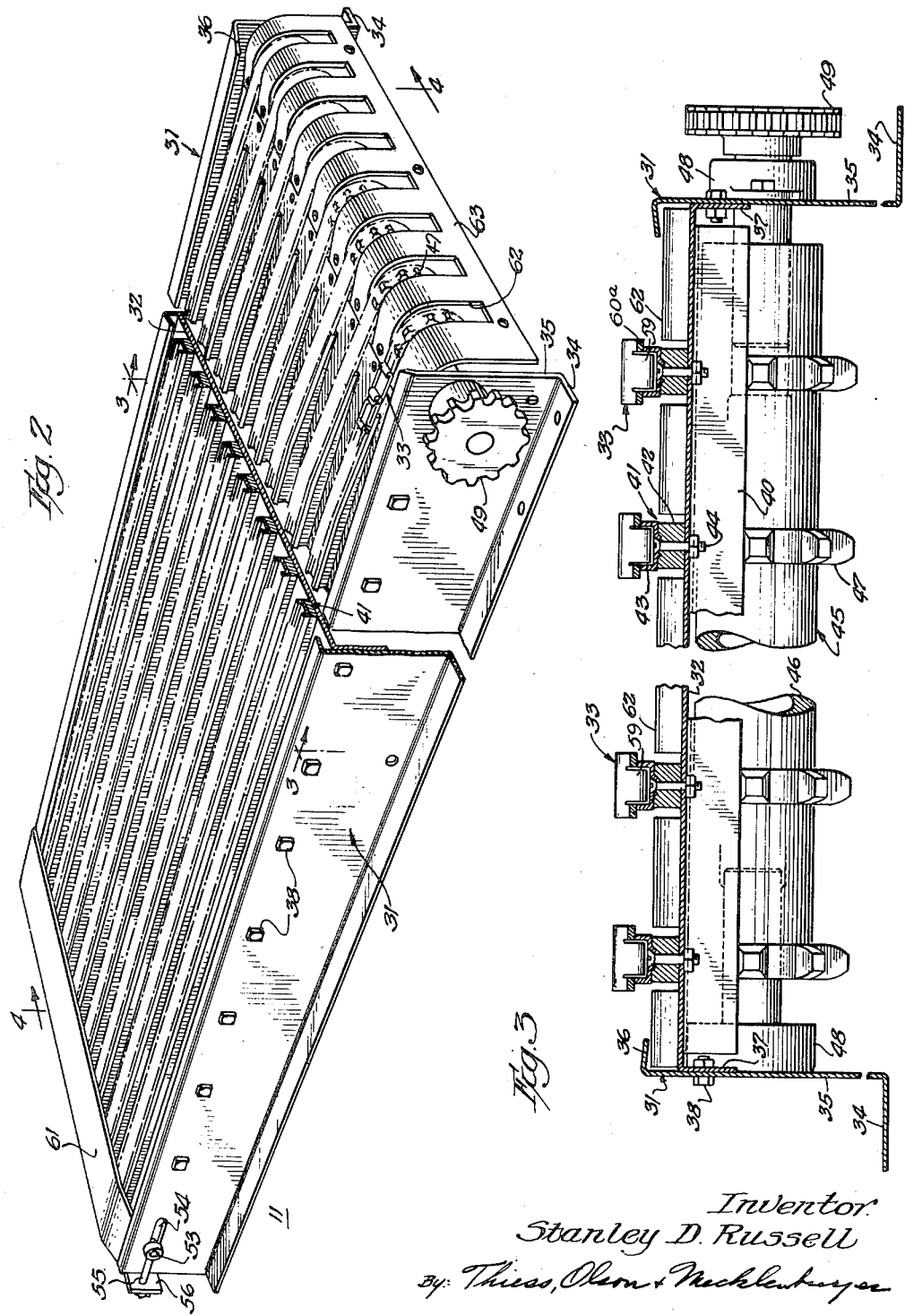

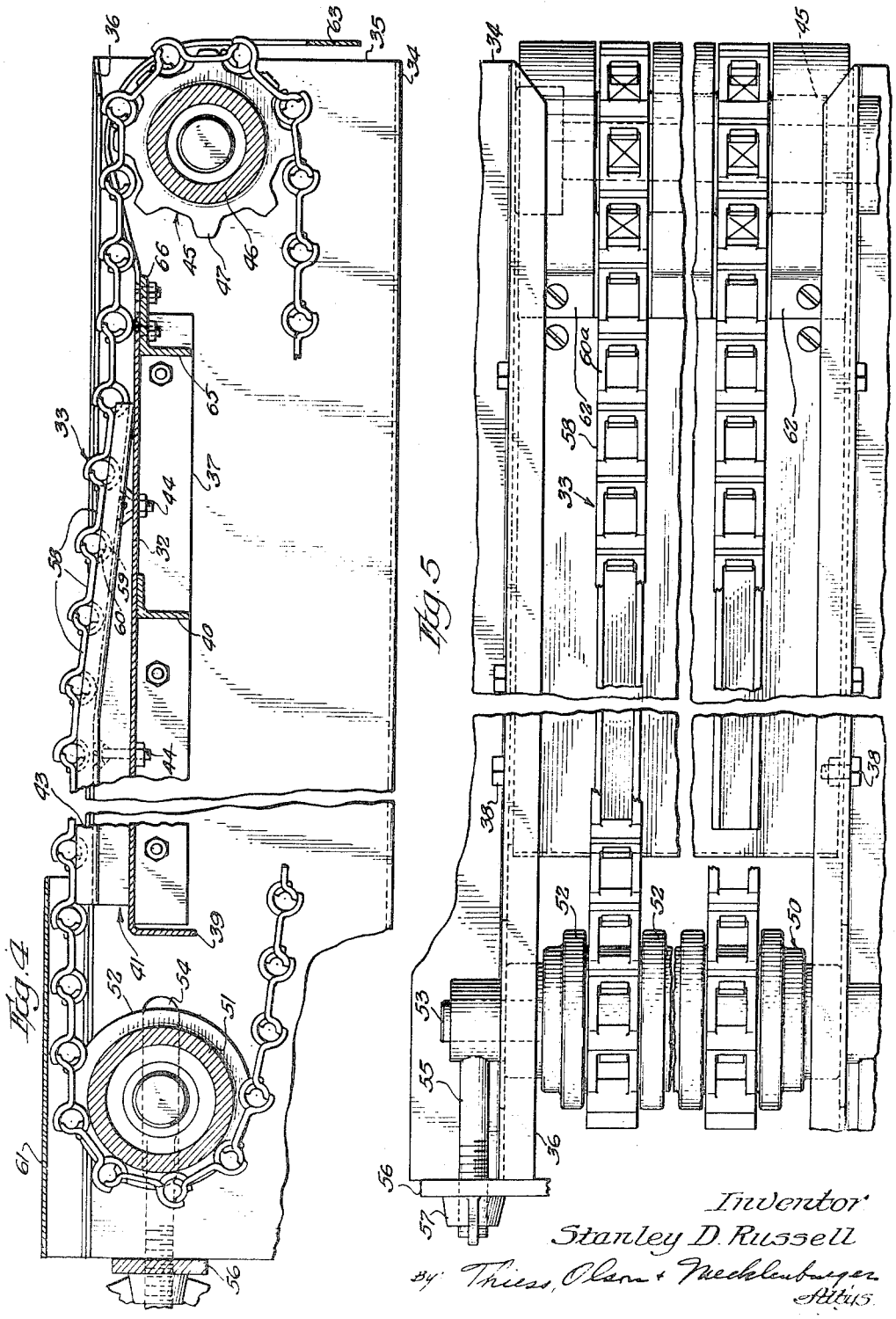

Patented Sept. 6, 1949

2,481,244

UNITED STATES PATENT OFFICE 2,481,244

MOVABLE BELT CONVEYER

Stanley D. Russell, Racine, Wis., assignor to J. I. Case Company, Racine, Wis., a corporation of Wisconsin Application March 13, 1945, Serial No. 582,501

4 Claims. (Cl. 198—190)

This application relates to movable belt conveyors, more particularly it relates to moving belt conveyors having a series of parallel spaced conveyor belts for pickup balers for hay or the like and it is an object of the invention to provide an improved conveyor of the character indicated.

It is a further object of the invention to provide an improved conveyor having a plurality of parallel conveyor belts wherein the hay or other crop rests substantially entirely on the conveyor belts.

It is a further object of the invention to provide an improved conveyor having a plurality of parallel conveyor belts in which each belt has an individual continuous support substantially throughout its entire length.

In carrying out the invention in one form, a conveyor for crop harvesting apparatus is provided in which the conveyor comprises a deck, drive means at one end of the deck, a guide means at the other end of the deck and a plurality of parallel belts vertically spaced from the deck and extending around the drive and guide means. Individual supports are provided for each of the plurality of belts to space the belts vertically from the deck and to provide a continuous support for the belt throughout its length. The lateral spacing of the supports and the vertical spacing of the belts are related so that the harvested material being conveyed does not sag into contact with the deck.

For a more complete understanding of the invention, reference should now be had to the accompanying drawings, in which:

Fig. 2 is a perspective view with a transverse section broken out of the conveyor shown in Fig. 1;

Fig. 3 is an enlarged sectional view with a section broken out taken substantially in the direction of the arrows 3—3 of Fig. 2;

Fig. 4 is an enlarged sectional view with a section broken out taken substantially in the direction of arrows 4—4 of Fig. 2; and Fig. 5 is a top plan view partially broken away and with central sections broken out of Fig. 2.

Figure 1:
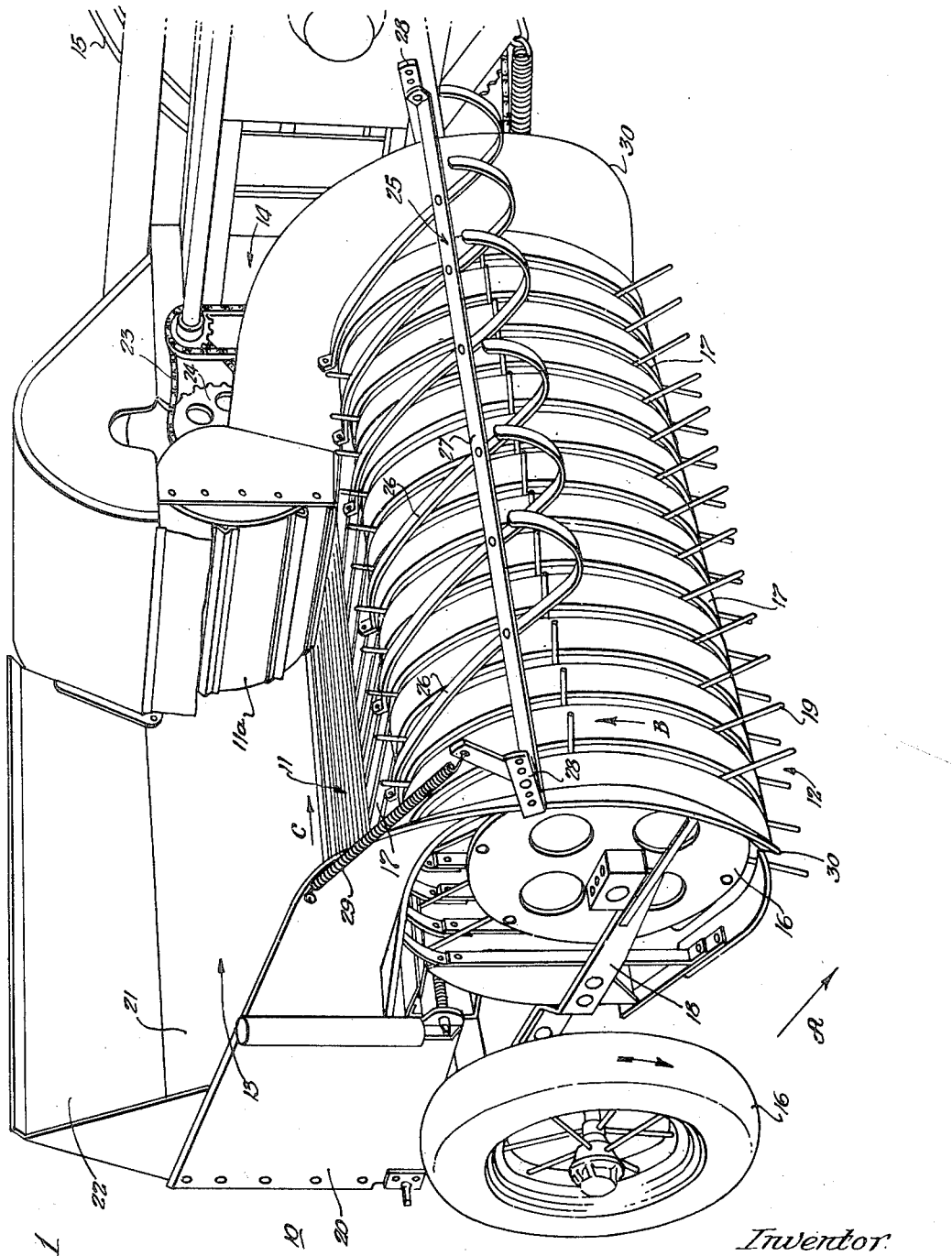
Fig. 1 is a fragmentary view in perspective of an assembled baler embodying the invention.

Referring to the drawings in more detail, the invention is embodied in a pickup baler 10 including a conveyor 11. While the conveyor 11 is shown and will be described in connection with a hay baler, it will be clear to those skilled in the art that changes may be made to adapt the conveyor for use in any application where articles are to be conveyed, particularly where the articles are relatively limp, such as cured crops without departing from the spirit and scope of the invention.

The hay baler 10 is of a well known type and is adapted to be driven in a direction indicated by the arrow A by a tractor or any other suitable means not illustrated. The baler comprises a framework supporting the various elements including a pickup device 12, a hopper 13, the conveyor 11, a feed roller 11a, a baling chamber 14 and a power device for operating the baling mechanism which is exemplified by the fly wheel 15. The baler mechanism is supported on two wheels connected by an axle, only the wheel 16 being shown.

The pickup device 12 comprises a cylinder 16 supported within a series of curved stripper elements 17 by support members 18 at each end. The support members 18, in addition to supporting the pickup device 16 within the stripper elements, attach the complete pickup device to the baler framework as shown. Forming part of the pickup cylinder 16 are a plurality of rows of spring tines 19 extending outwardly from the pickup cylinder and spaced between the various stripper elements 17. The pickup cylinder is adapted to rotate in a direction indicated by the arrow B when the baler is moved along the ground thereby causing the tines 19 to pick up the windrow of hay over which the baler is being pulled. The pickup mechanism is supported in such a position that the ends of the tines 19 are clear of the ground at all times, the height being adjusted for particular conditions.

Spaced directly in back and at the top of the pickup device is a hopper 13 which includes an end feeder sheet 20, a back feeder sheet 21 and a wind guard 22. Forming the floor of the hopper 13 is the conveyor assembly 11 and closing the other end of the hopper is the feeder drum 11a which is adapted to be driven through a suitable mechanism indicated by the chain 23 and the sprocket 24. Extending over the stripper elements 17 is a wind guard 25 having a series of elements 26 joined by a longitudinal member 27. The longitudinal member is pivoted to the brackets 28 and is biased in the downward direction by means of a spring 29 so that any hay that is picked up by the spring tines 19 is carried underneath of elements 26 and is thereby prevented from being blown off of the baler. To insure that all of the material to be picked up is guided into the pickup device, the flare sheets 30 are arranged at each end of the pickup device. As the baler is towed along in the direction A the revolving tines 19 pick up the material from the windrow, carry it over the stripper elements 17 and force the material into the conveyor 11 which moves in the direction of the arrow C. The conveyor 11 carries the material into contact with the feeder drum 11a which feeder drum forces the material into the baling chamber 14. It will be apparent from this description that the baling process is carried on in a continuous and direct manner.

Referring more particularly to Figs. 2, 3, 4 and 5 the conveyor 11 is shown as a complete and unitary assembly which may be removed as a whole from the baler or other apparatus and includes the sills 31, the conveyor deck 32, a series of parallel belts or chains 33 supported throughout their length on guides extending vertically from the conveyor deck and a sprocket sleeve 45 for driving the belts or chains 33, the chains 33 being indicated by phantom lines for purposes of clarity. The sills 31 extend throughout the length of the conveyor, form the side frames thereof and include base flanges 34 for attaching the conveyor to a baler, vertical webs 35 and the top flanges 36, the flanges 34 and 36 providing the necessary rigidity for the sills to resist horizontal bending. The sills 31 are spaced apart laterally and rigidly held between them, below the top flanges 36, is the conveyor deck 32 which includes a flat portion extending substantially the full length of the conveyor and downwardly extending flanges 37 at the sides of the flat portion which serve to impart stiffness to the deck and to which the sills are fastened by means of the bolts 38. One end of the conveyor deck is bent to form the downwardly extending flange 39 and to further stiffen the deck, stiffening ribs 40 are welded thereto at spaced intervals. The stiffening ribs may be angle members, as shown, or they may be of any other desired shape and further the stiffening ribs may be fastened to the deck by well known means other than welding, such as rivets for example. Fastened to the other end of the conveyor deck, by means of bolts, there is an angle member 65 having its flange 66 extending beyond the edge of the deck to form a supporting ledge for a purpose to be described. The flat conveyor deck and the sills at the sides thereof unite to form a rigid table-like structure for supporting the operating shafts at the ends of the sills and for supporting the conveying belts on the conveyor deck.

Extending parallel to the sills 31 and laterally spaced apart from each other are a plurality of belt supports 41, each belt support having a top surface along which a conveyor belt is adapted to move, the top surface being vertically spaced from the conveyor deck. Each belt support includes a spacing rib or shim 42 and a channel guiding member or a glide 43 lying along the upper surface of the spacing shim 42, the glide 43 and the shim 42 being fastened to each other and to the conveyor deck 32 by means of conical headed bolts 44. The glide 43 is of metal and includes a base which lies next to the spacing shim and vertical side flanges between which a portion of the belt is received thereby to prevent the belt from coming off of the belt support, the top surfaces of the vertical side flanges serving as the sliding surface for the belts. While the belt supports 41 are shown as being made of two parts, a spacing rib 42 and a guiding member 43, it will be understood that the supports may be made of a single member which may be metal, for example, whereas in the illustrated construction the glide is made of metal while the spacing rib is made of wood in the interest of material economy. Referring to Fig. 4, it will be seen that the supporting members 41 are substantially the same length as the conveyor deck 32 and have downwardly tapered portions at one end, the tapered end of the spacing ribs being substantially flush with the conveyor deck. This construction is effected by cutting a tapered portion on the spacing rib and bending the glide to conform thereto.

Supported at the baling chamber end of the conveyor, for driving the conveying belts, is a sprocket sleeve 45 which consists of a hollow cylindrical body 46 and axially spaced sprockets 47. The hollow body 46 is of relative large diameter and the sprockets are integrally formed therewith, the spacing of the sprockets along the shaft being such that each sprocket is in alignment with one of the belt supports so that a belt engaging one of the sprockets will be received in a glide of a corresponding belt support. The sprocket sleeve is mounted on the sills 31 by means of stub shafts supported in bearings which are contained in bearing cups 48 attached to the vertical webs 35 of the sills 31. Attached at one end to the sprocket sleeve 45 is a sprocket 49 by means of which the sprocket sleeve is driven.

Supported at the outer end of the conveyor is a guide or idler sleeve 50 which consists of a hollow cylindrical member 51 and a series of integrally formed circumferential ridges 52. The ridges are formed in pairs defining a circumferential groove between them to receive one of the conveyor belts, the grooves being axially spaced and each groove being in alignment with one of the spacing ribs 41. The idler sleeve 50 is adjustably mounted in the sills by means of stub shafts 53 extending from the ends of the idler sleeve, which stub shafts extend through the slots 54 in the sills. The stub shafts 53 are received in the eyes of the eye bolts 55 which extend rearwardly through openings in the plates 56. Wing nuts 57 serve to adjust the eye bolts 55 and consequently adjust the position of the idler sleeve 50 to tighten or loosen the belts 33 passing around corresponding sprockets and circumferential grooves. It is clear that a stationary guide may be substituted for the idler sleeve since the idler sleeve serves merely to position the conveying belts and is made to rotate to substantially eliminate friction.

The structure as thus far described is a framework which comprises a flat deck supported by two side members or sills 31 which side members also serve to support a driving sprocket 45 and a grooved idler sleeve 50. Fastened to the flat deck are a series of channel guide members 43 which are vertically spaced from the deck and which are in alignment with the sprockets on the driving sprocket at one end of the conveyor and the circumferential grooves on the idler sleeve at the other end of the conveyor. To convey the material a plurality of endless link belts or chains are arranged on the conveyor so that the links 58 of each belt are engaged by one of the drive sprockets at one end of the conveyor and portions of the links are received in the grooves of the idler sleeve at the other end and within the channel members 43. The links 58 are of a well known type in which two tongues 59 and 60 are stamped from a rectangular piece of metal. The tongue 59 is bent rearwardly to form a hook which engages that portion of the link formed by bending the tongue 60 of an adjacent link forwardly, the interengagement of the tongues 59 and 60 effectively constituting a hinge about which any two adjacent links bend. The curved tongue or hook 59 of each link is received between the vertical flanges of the channel member 43 and the circumferential grooves on the idler sleeve 50 to confine each belt to its particular support, the sprocket teeth 47 engaging the links by means of the hole resulting by stamping out the tongues 59 and 60. As shown, after the tongues 59 and 60 are stamped out webs 60a are left at the sides of the links, which webs lie on the vertical flanges of the channel member to support the belts or chains. While a continuous link chain has been shown it will be clear that the conveyor structure may be modified to adapt it to use flexible belts made of rubber, textiles or other well known belts or the like without departing from the spirit and scope of the invention.

To prevent any material being conveyed from becoming entangled with the idler sleeve 50 a guard plate 61 is fastened to the sills 31. The guard plate extends over the idler sleeve and forwardly a sufficient distance over the guide channels 43 and the chains 33 received therein so that material is unable to work itself rearwardly to the idler sleeve. At the baling chamber end of the conveyor a stripper sheet having a series of parallel tongues 62 extending from a connecting member 63 is arranged with the tongues 62 spaced between the sprockets. The tongues 62 curve upwardly from the conveyor deck, curve around the sprockets and extend downwardly to join with the connecting member 63 thereby to completely shield the sprockets and cause any material moving on the conveyor to be removed from the conveyor belts. In order to have a substantially smooth deck at all points the ends of the tongues 62 are fastened to the flange 66, the thickness of the tongues being such that the deck surface and the tongues are flush with each other.

As pointed out previously in this application, the ends of the belt supports 41 taper at the end adjacent the baling chamber. Since the tapered end of the spacing rib 42 is substantially flush with the conveyor deck the conveyor belts lie substantially flat on the conveyor deck when the belts leave the guide channels 43 (Fig. 4). There is, therefore, a depressed or lowered portion of the conveyor which is placed below the feeder drum 11a in the assembled condition of the baler.

The spacing between the adjacent ones of the conveyor belts and the height of the belts off of surface of the conveyor deck are factors in determining the construction of a conveyor so that the particular type of hay or similar material being conveyed will not sag into contact with the conveyor deck. Thus if the stalks are stiff wide spacing and low height is desirable and for stalks which are relatively limp a close spacing and a greater height must be used. It has been found that optimum results, i. e. the hay does not sag into contact with the deck, in case of ordinary hay which has been raked into a window are obtained by having a ratio of spacing of the belt supports to the height of the belt supports off of the conveyor deck of approximately four.

While a particular embodiment of the invention has been shown it will be understood, of course, that the invention is not limited thereto since many modifications may be made, and it is, therefore, contemplated by the appended claims to cover any such modifications as come within the true spirit and scope of the invention.

Having thus described the invention, what is claimed and desired to be secured by Letters Patent is:

1. In a conveyor, a deck, an active element including an upwardly open channel member disposed above said deck, and a length of chain of the character provided with a series of central projecting hinge portions, and a web projecting at each side of said hinge portions, said chain being positioned on said channel in a manner such that the projecting hinge portions extend downwardly into the channel and the side webs rest on the upwardly directed edges of the channel, and means for moving the chain in the desired direction.

2. In a conveyor, the combination of a deck portion, a plurality of substantially parallel upwardly open channel members spaced above said deck, a length of chain associated with each channel, said chain being of a character providing a series of central projecting hinge portions and a web projecting at each side, said chains being positioned on said channels in a manner such that the projecting hinge portions engage the channels in guided relation and the web portions rest on the upwardly directed edges of the channels, and said parallel channels being sufficiently close to each other that material resting on said chains will bridge the space between adjacent chains and not sag between them into contact with said deck, and means for imparting movement to said chains.

3. In a conveyor for handling cut crop fibrous material, a substantially horizontal deck, a plurality of endless chains having their upper runs parallel and extending above said deck transversely of the line of travel of the apparatus, a plurality of elongated parallel guiding and supporting elements for said upper runs for supporting them and guiding them to travel a substantial distance above said deck, sprocket wheels engaging said chains, respectively, at the delivery end thereof, and stripper means at the delivery end extending upwardly and rearwardly from the delivery end of the deck to a position between the chains.

4. In a conveyor for handling cut crop fibrous material, a substantially horizontal deck, a plurality of endless chains having their upper runs parallel and extending above said deck transversely of the line of travel of the apparatus, a plurality of elongated parallel guiding and supporting elements for said upper runs for supporting them and guiding them to travel a substantial distance above said deck, sprocket wheels engaging said chains, respectively, at the delivery end thereof, and stripper means at the delivery end extending upwardly and rearwardly from the delivery end of the deck to a position between the chains and adjacent the outer periphery of said sprocket wheels.

STANLEY D. RUSSELL.

REFERENCES CITED

The following references are of record in the file of this patent:

UNITED STATES PATENTS

| Number | Name | Date |
| --- | --- | --- |
| 707,343 | Naysmith et al. | Aug. 19, 1902 |
| 869,654 | Rideout | Oct. 29, 1907 |
| 964,191 | Steele | July 12, 1910 |
| 1,201,412 | Williams | Oct. 17, 1916 |
| 1,282,379 | Christensen | Oct. 22, 1918 |
| 1,535,785 | Luce | Apr. 28, 1925 |
| 1,555,577 | Horner | Sept. 29, 1925 |
| 1,868,538 | McKee et al. | July 26, 1932 |